US012561822B2

(12) United States Patent
Jeong et al.

(10) Patent No.: US 12,561,822 B2
(45) Date of Patent: Feb. 24, 2026

(54) UNIFIED SIMULTANEOUS OPTICAL FLOW AND DEPTH ESTIMATION

(71) Applicant: QUALCOMM Incorporated, San Diego, CA (US)

(72) Inventors: Jisoo Jeong, San Diego, CA (US); Hong Cai, San Diego, CA (US); Babak Ehteshami Bejnordi, Amsterdam (NL); Risheek Garrepalli, San Diego, CA (US); Rajeev Yasarla, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 284 days.

(21) Appl. No.: 18/468,656

(22) Filed: Sep. 15, 2023

(65) Prior Publication Data

US 2025/0095182 A1 Mar. 20, 2025

(51) Int. Cl.
| | |
|---|---|
| *G06T 7/00* | (2017.01) |
| *G06T 7/246* | (2017.01) |
| (Continued) | |

(52) U.S. Cl.
CPC .............. G06T 7/593 (2017.01); G06T 7/246 (2017.01); G06T 7/285 (2017.01); (Continued)

(58) Field of Classification Search
CPC ......... G06T 7/593; G06T 7/246; G06T 7/285; G06T 2207/10012; G06T 2207/20084; (Continued)

(56) References Cited

U.S. PATENT DOCUMENTS

| | | | |
|---|---|---|---|
| 10,380,753 B1* | 8/2019 | Csordás | G06T 7/593 |
| 2020/0084427 A1* | 3/2020 | Sun | G06N 3/0895 |

(Continued)

FOREIGN PATENT DOCUMENTS

| | | |
|---|---|---|
| KR | 20200095251 A | 8/2020 |

OTHER PUBLICATIONS

Chi Cheng et al: Feature-Level Collaboration: Joint Unsupervised Learning of Optical Flow, Stereo Depth and Camera Motion, 2021 IEEE/CVF Conference on Computer Vision and Pattern Recognition (CVPR), IEEE, Jun. 20 (Year: 2021).*

(Continued)

*Primary Examiner* — Xiao Liu
(74) *Attorney, Agent, or Firm* — Polsinelli LLP

(57) ABSTRACT

Techniques and systems are provided for image processing. For instance, a process can include correlating a first set of features from a first viewpoint with a second set of features from a second viewpoint at a first time period to generate a first disparity cost volume; correlating a third set of features from the first viewpoint at a second time period with the first set of features to generate a first optical flow cost volume; gating the first disparity cost volume to generate first intermediate disparity information; gating the first optical flow cost volume to generate first intermediate optical flow information; correlating the first set of features, the second set of features, and the first intermediate optical flow information to generate disparity information for output; and correlating the third set of features, the first set of features, and the first intermediate disparity information to generate optical flow information for output.

21 Claims, 8 Drawing Sheets

(51) Int. Cl.
G06T 7/285 (2017.01)
G06T 7/593 (2017.01)
(52) U.S. Cl.
CPC ............... *G06T 2207/10012* (2013.01); *G06T 2207/20084* (2013.01); *G06T 2207/20228* (2013.01)
(58) Field of Classification Search
CPC .. G06T 2207/20228; G06T 7/20; G06V 10/82
See application file for complete search history.

(56) References Cited

U.S. PATENT DOCUMENTS

2020/0211206 A1   7/2020   Wang et al.
2022/0358359 A1   11/2022   Huang
2022/0392083 A1   12/2022   Guizilini et al.

OTHER PUBLICATIONS

Sun et al, Proceedings of the IEEE Conference on Computer Vision and Pattern Recognition (CVPR), pp. 8934-8943 (Year: 2018).*
Zhu et al DenseNet for Dense Flow, arXiv:1707.06316v1 Jul. 19 (Year: 2017).*
Chi C., et al., "Feature-Level Collaboration: Joint Unsupervised Learning of Optical Flow, Stereo Depth and Camera Motion", 2021 IEEE/CVF Conference on Computer Vision and Pattern Recognition (CVPR), IEEE, Jun. 20, 2021, pp. 2463-2473, XP034009036, abstract figures 1, 2 sections 3, 4.2.
International Search Report and Written Opinion—PCT/US2024/039417—ISA/EPO—Nov. 5, 2024.
Zhu Y., et al., "DenseNet for Dense Flow", arXiv:1707.06316v1, arxiv.org, Cornell University Library, 201 Olin Library Cornell University, Ithaca, NY 14853, Jul. 19, 2017, 5 pages, XP080778131, abstract figure 1.

* cited by examiner

202

FULLY CONNECTED

204

LOCALLY CONNECTED

210

212

214

216

206

CONVOLUTIONAL

208

600

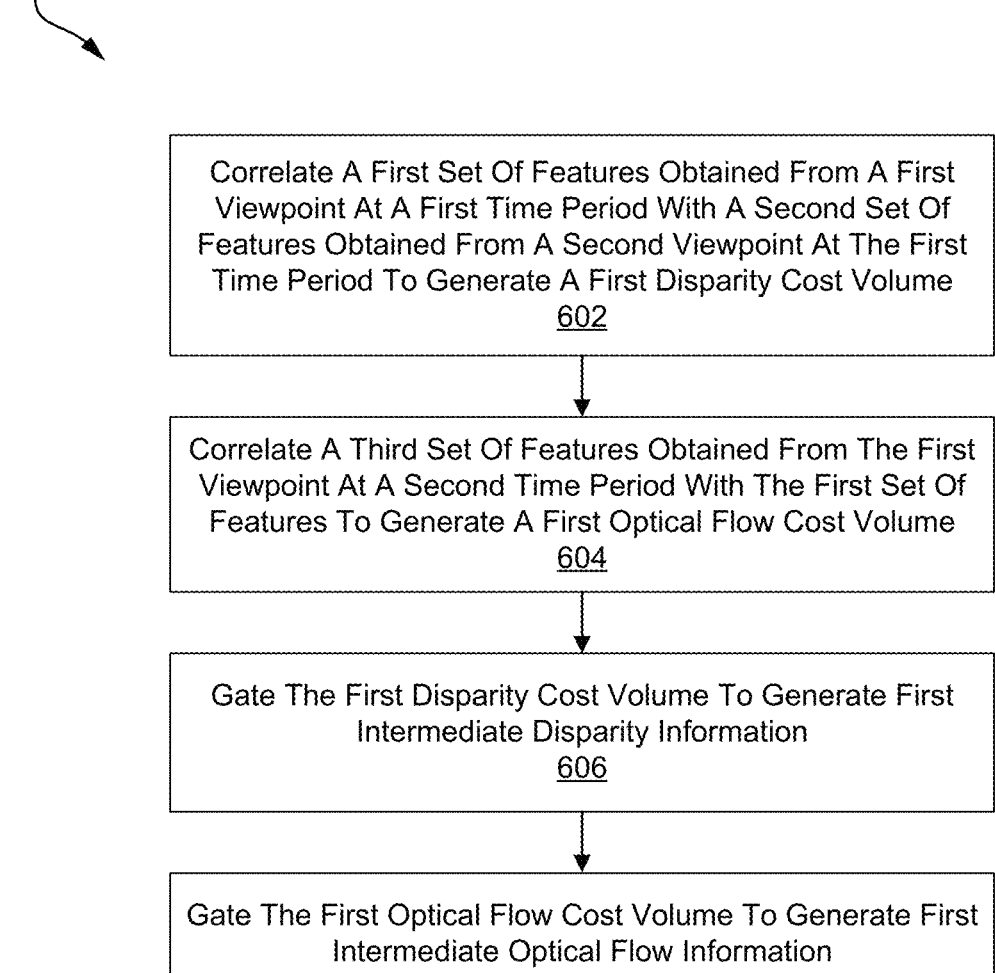

Correlate A First Set Of Features Obtained From A First Viewpoint At A First Time Period With A Second Set Of Features Obtained From A Second Viewpoint At The First Time Period To Generate A First Disparity Cost Volume
602

Correlate A Third Set Of Features Obtained From The First Viewpoint At A Second Time Period With The First Set Of Features To Generate A First Optical Flow Cost Volume
604

Gate The First Disparity Cost Volume To Generate First Intermediate Disparity Information
606

Gate The First Optical Flow Cost Volume To Generate First Intermediate Optical Flow Information
608

Correlate The First Set Of Features, Second Set Of Features, And The First Intermediate Optical Flow Information To Generate Disparity Information For Output
610

Correlate The Third Set Of Features, The First Set Of Features, And The First Intermediate Disparity Information To Generate Optical Flow Information For Output
612

FIG. 6

UNIFIED SIMULTANEOUS OPTICAL FLOW AND DEPTH ESTIMATION

FIELD

The present application is related to image processing. For example, aspects of the present application relate to systems and techniques for unified simultaneous optical flow and depth estimation.

BACKGROUND

Many devices and systems allow image and/or video data to be processed. The processed output may be used for a variety of operations, such as local mapping, object avoidance, virtually interacting with or responding to objects in the environment, and a host of other operations. Examples of such operations that may be performed on images and/or video include depth estimation and optical flow. Optical flow may be used to understand object movement in a captured scene and optical flow analysis may be applied as a part of object tracking, video compression and/or frame interpolation. Depth sensing provides information in a third dimension (3D) and depth sensing may be used for 3D reconstruction and/or background removal.

SUMMARY

Systems and techniques are described herein for image processing. The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, apparatuses, methods and computer-readable media for image processing are provided. In some aspects, a method for image processing is provided. The method includes: correlating a first set of features obtained from a first viewpoint at a first time period with a second set of features obtained from a second viewpoint at the first time period to generate a first disparity cost volume; correlating a third set of features obtained from the first viewpoint at a second time period with the first set of features to generate a first optical flow cost volume; gating the first disparity cost volume to generate first intermediate disparity information; gating the first optical flow cost volume to generate first intermediate optical flow information; correlating the first set of features, the second set of features, and the first intermediate optical flow information to generate disparity information for output; and correlating the third set of features, the first set of features, and the first intermediate disparity information to generate optical flow information for output.

In some aspects, an apparatus for image processing is provided. The apparatus includes at least one memory and at least one processor coupled to the at least one memory, the at least one processor being configured to: correlate a first set of features obtained from a first viewpoint at a first time period with a second set of features obtained from a second viewpoint at the first time period to generate a first disparity cost volume; correlate a third set of features obtained from the first viewpoint at a second time period with the first set of features to generate a first optical flow cost volume; gate the first disparity cost volume to generate first intermediate disparity information; gate the first optical flow cost volume to generate first intermediate optical flow information; correlate the first set of features, the second set of features, and the first intermediate optical flow information to generate disparity information for output; and correlate the third set of features, the first set of features, and the first intermediate disparity information to generate optical flow information for output.

In some aspects, a non-transitory computer-readable medium is provided. The non-transitory computer-readable medium has stored thereon instructions that, when executed by at least one processor, cause the at least one processor to: correlate a first set of features obtained from a first viewpoint at a first time period with a second set of features obtained from a second viewpoint at the first time period to generate a first disparity cost volume; correlate a third set of features obtained from the first viewpoint at a second time period with the first set of features to generate a first optical flow cost volume; gate the first disparity cost volume to generate first intermediate disparity information; gate the first optical flow cost volume to generate first intermediate optical flow information; correlate the first set of features, the second set of features, and the first intermediate optical flow information to generate disparity information for output; and correlate the third set of features, the first set of features, and the first intermediate disparity information to generate optical flow information for output.

In some aspects, an apparatus for image processing is provided. The apparatus includes: means for correlating a first set of features obtained from a first viewpoint at a first time period with a second set of features obtained from a second viewpoint at the first time period to generate a first disparity cost volume; means for correlating a third set of features obtained from the first viewpoint at a second time period with the first set of features to generate a first optical flow cost volume; means for gating the first disparity cost volume to generate first intermediate disparity information; means for gating the first optical flow cost volume to generate first intermediate optical flow information; means for correlating the first set of features, the second set of features, and the first intermediate optical flow information to generate disparity information for output; and means for correlating the third set of features, the first set of features, and the first intermediate disparity information to generate optical flow information for output.

In some aspects, one or more of the apparatuses described herein can include or be part of an extended reality device (e.g., a virtual reality (VR) device, an augmented reality (AR) device, or a mixed reality (MR) device), a mobile device (e.g., a mobile telephone or other mobile device), a wearable device (e.g., a network-connected watch or other wearable device), a personal computer, a laptop computer, a server computer, a television, a video game console, or other device. In some aspects, the apparatus further includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit data or information over a transmission medium to at least one device. In some aspects, the processor includes a central processing unit (CPU), a graphics processing unit (GPU), a neural processing unit (NPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures:

FIG. 6 is a flow diagrams illustrating a process for processing image data, in accordance with aspects of the present disclosure

DETAILED DESCRIPTION

Figure 1:
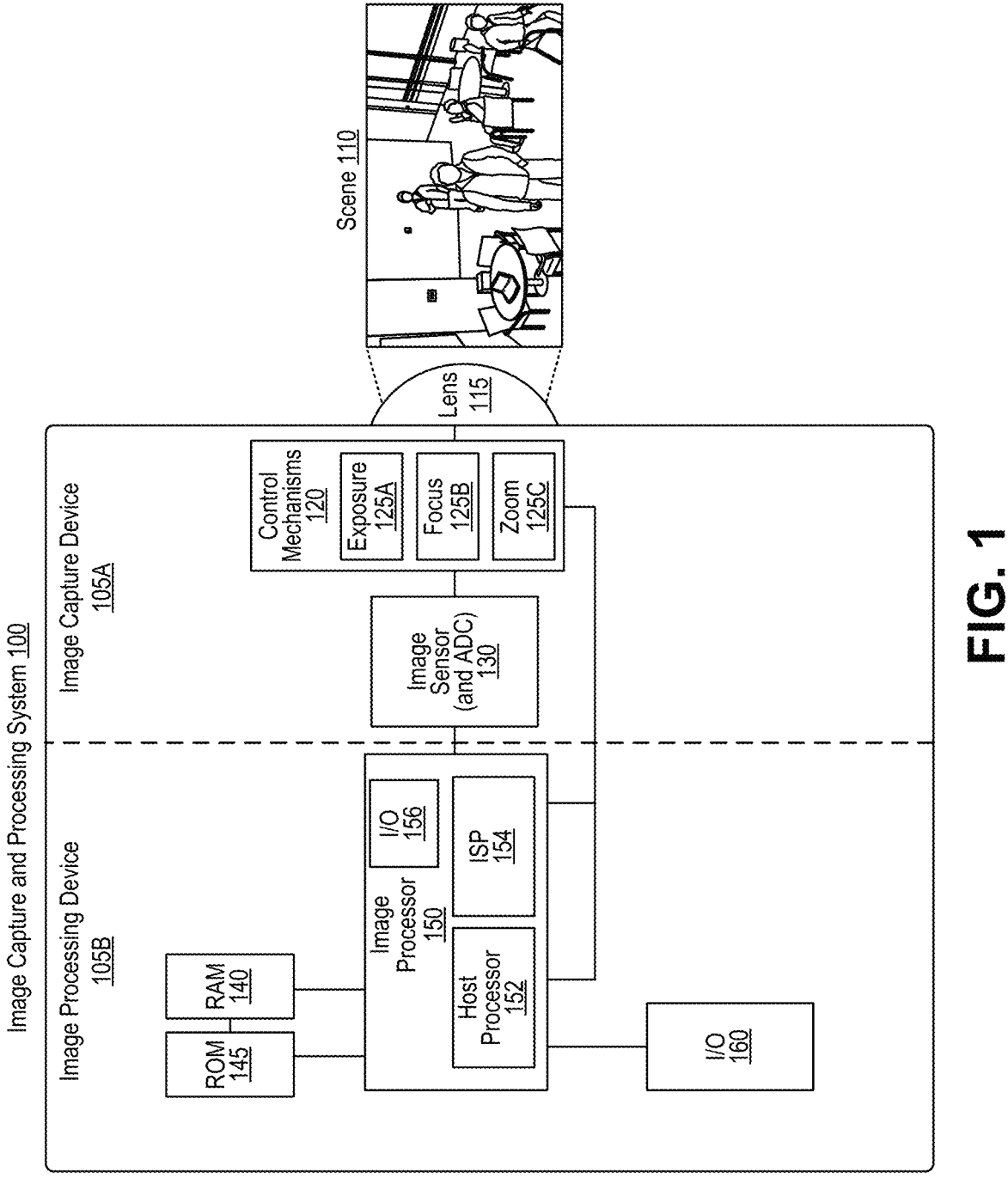
FIG. 1 is a block diagram illustrating an architecture of an image capture and processing system, in accordance with aspects of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

The computational complexity of image processing by systems (e.g., vehicles or systems of vehicles such as autonomous and/or semi-autonomous driving vehicles, extended reality (XR) devices such as augmented reality (AR) or virtual reality (VR) devices, etc.), which may be expected to respond in real time or near-real time to user actions and/or events occurring in an environment, can impose significant power and resource demands. For example, the computational complexity of depth sensing and optical flow analysis for images of objects in an environment can impose large power and resource demands on devices. Such power and resource demands can be a limiting factor in implementing such systems (e.g., reducing the ability of an XR device to efficiently generate and animate virtual content in a low-latency manner or reducing the ability of an autonomous vehicle to detect and/or react to road conditions). The power and resource demands of image processing systems may be exacerbated by recent trends towards implementing such technologies in more mobile and/or smaller and lighter devices, which reduces available battery power. Therefore, increasingly efficient and accurate depth sensing and optical flow analysis may be useful.

Systems, apparatuses, electronic devices, methods (also referred to as processes), and computer-readable media (collectively referred to herein as "systems and techniques") are described herein for providing unified simultaneous optical flow and depth estimation information. For example, depth information may be obtained from images from at least two viewpoints and optical flow information may be obtained from images from at least two time periods. In some cases, optical flow information may be extracted from a single viewpoint for the at least two time periods. Features may be extracted from the images. For example, a first set of features may be extracted from a first image taken from a first viewpoint (e.g., a left image), and a second set of features may be extracted from a second image taken from a second viewpoint (e.g., right image). The first and second images may be taken at a first point in time (e.g., a first time period). A third set of features may be extracted from the first image at a later point in time (e.g., at a second time period). Features of the first image may be correlated against features of the second image to generate a disparity cost volume (e.g., correlation volume) indicating how features correlate across the viewpoints. In some cases, a null set of intermediate optical flow information may also be correlated with the features when generating the disparity cost volume. Similarly, features of the first image may be correlated against features of the third image to generate an optical flow cost volume indicating how features correlate across the time periods. In some cases, a null set of intermediate disparity information may also be correlated with the features when generating the optical flow cost volume.

The disparity cost volume may be input to a neural network layer that can predict the disparity as intermediate disparity information. Similarly, the optical flow cost volume may also be input to one or more neural network layers that can predict the optical flow as intermediate optical flow information. In some cases, the neural network layer(s) perform a gating operation. For instance, according to some aspects, the neural network layer(s) can include a gated recurrent unit to perform the gating operation. The intermediate optical flow information may be merged with any intermediate optical flow information previously determined (e.g., for the first pass, a null set of intermediate optical flow information may be used). Similarly, the intermediate disparity information may be merged with any intermediate disparity information previously determined.

The intermediate optical flow information may also be used to generate a second disparity cost volume along with the features of the first image and features of the second image. For example, a convolution and/or cross-attention operation between the optical flow information and the features of the first image and features of the second image may be performed and then a correlation operation performed between the features of the first image and features of the second image. The second disparity cost volume may also be passed into a neural network layer (e.g., gating layer to perform a gating operation) to predict the disparity as second intermediate disparity information.

Similarly, the disparity information may be used to generate a second optical flow cost volume along with features of the first image and features of the third image. For example, a convolution and/or cross-attention operation between the depth information and the features of the first image and features of the second image may be performed. A correlation operation may then be performed between the features of the first image and features of the second image. The second optical flow cost volume may also be input to a neural network layer (e.g., gating layer to perform a gating operation) to predict the optical flow as second intermediate optical flow information.

The second intermediate disparity information may be merged with the previous intermediate disparity information. Similarly, the second intermediate optical flow information may be merged with the previous intermediate optical flow information. Examples of techniques that can be used to perform the merging include summing, concatenation, etc. The merging may be repeated any number of times. Eventually, the merged intermediate optical flow information and merged disparity information may be output.

Various aspects of the application will be described with respect to the figures.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In some examples, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on the exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 7:
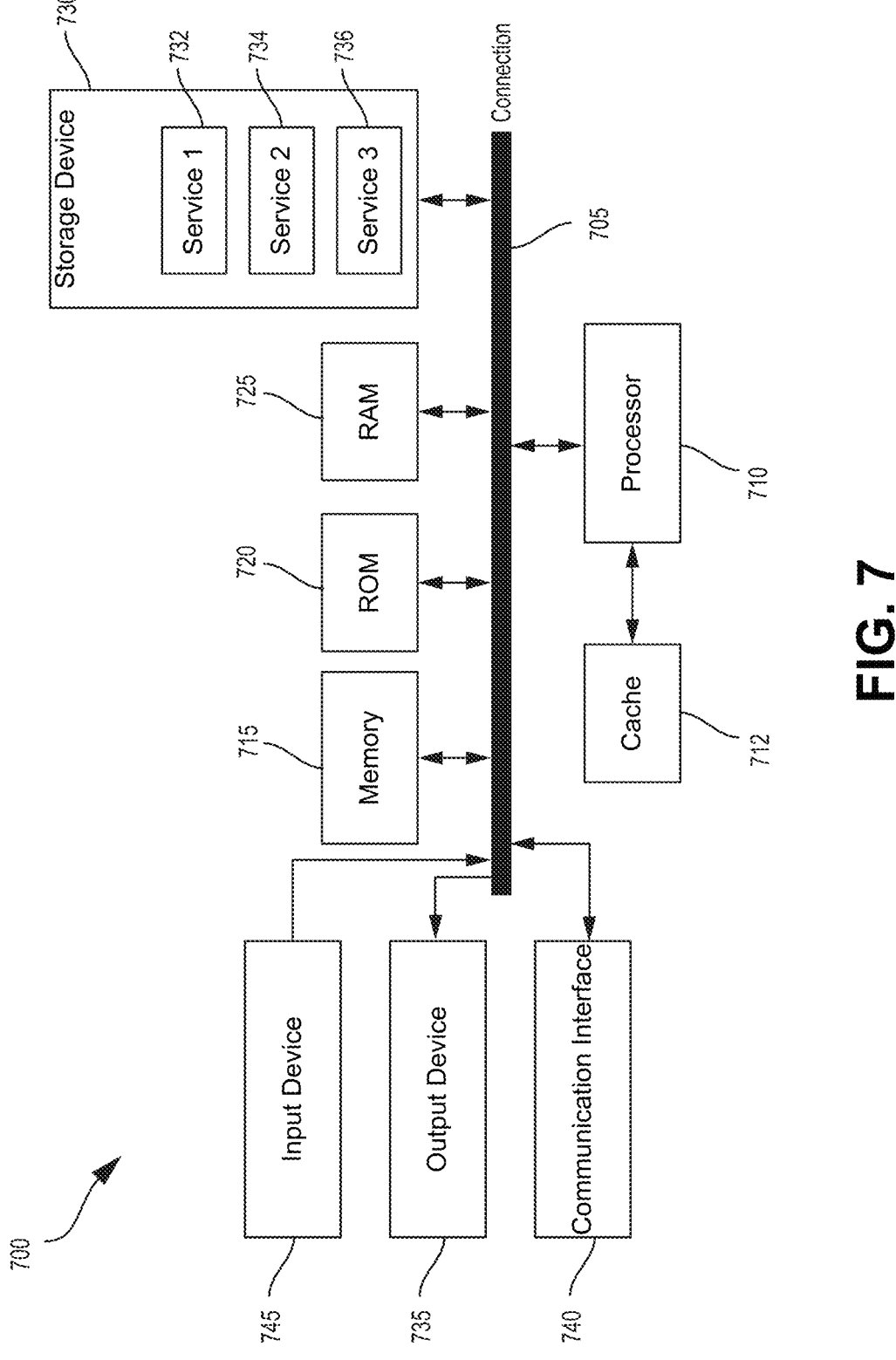
FIG. 7 is a diagram illustrating an example of a system for implementing certain aspects of the present technology.

The image processor 150 may include one or more processors, such as one or more image signal processors (ISPs) (including ISP 154), one or more host processors (including host processor 152), and/or one or more of any other type of processor 1010 discussed with respect to the computing system 700 of FIG. 7. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In some cases, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1025, read-only memory (ROM) 145/1020, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices, any other input devices, or some combination thereof. In some cases, a caption may be input into the image processing device 105B through a physical keyboard or keypad of the I/O devices 160, or through a virtual keyboard or keypad of a touchscreen of the I/O devices 160. The I/O devices 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O devices 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O devices 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.10 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

In some cases, images captured by the image capture and processing system 100 may be processed by neural networks and/or machine learning (ML) systems. A neural network is an example of an ML system, and a neural network can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input. The connections between layers of a neural network may be fully connected or locally connected. Various examples of neural network architectures are described below with respect to FIG. 2A-FIG. 3.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
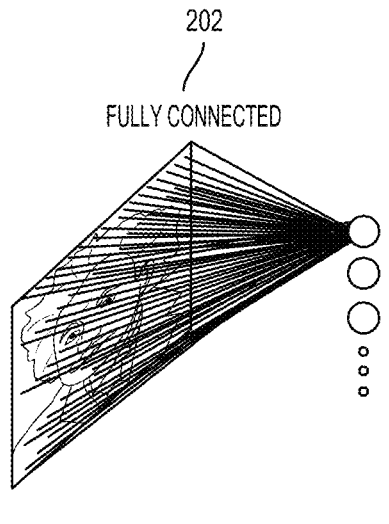
FIG. 2A is a diagram illustrating an example of a fully-connected neural network, in accordance with some examples of the present disclosure.
Figure 2B:
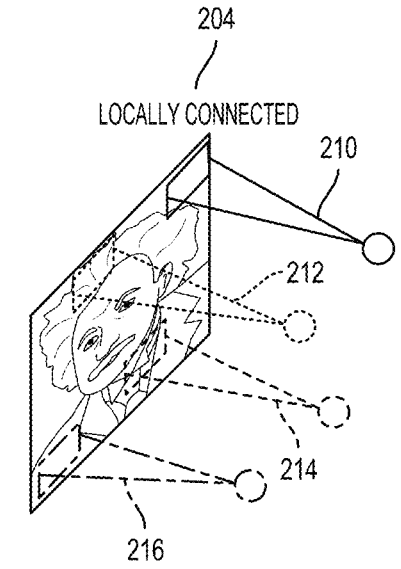
FIG. 2B is a diagram illustrating an example of a locally-connected neural network, in accordance with some examples of the present disclosure.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
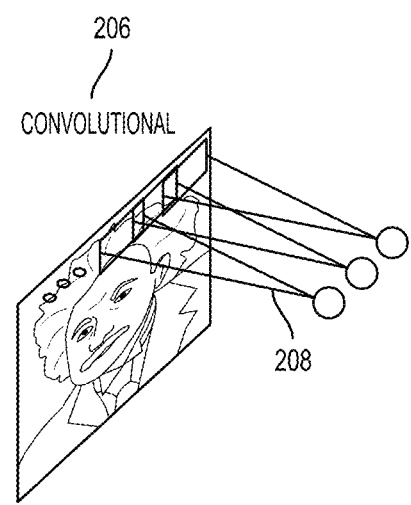
FIG. 2C is a diagram illustrating an example of a convolutional neural network, in accordance with some examples of the present disclosure.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure.

Figure 2D:
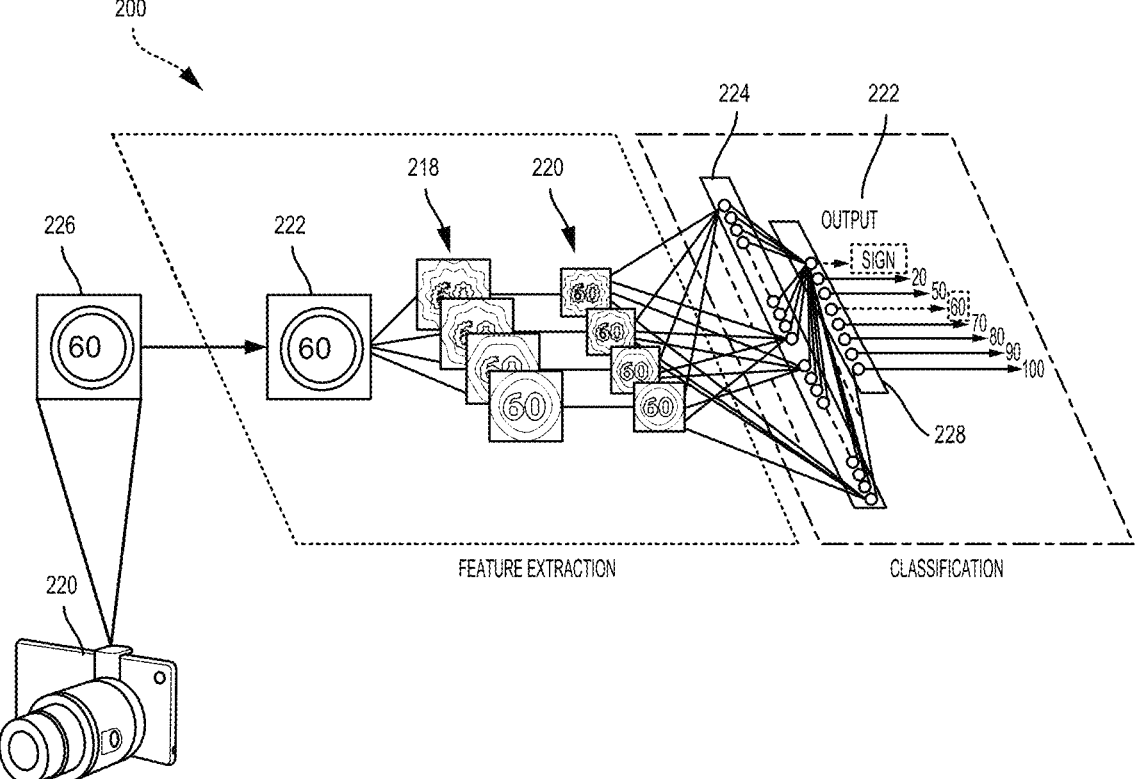
FIG. 2D is a diagram illustrating an example of a deep convolutional network (DCN) for recognizing visual features from an image, in accordance with some examples of the present disclosure.

One type of convolutional neural network is a deep convolutional network (DCN). FIG. 2D illustrates a detailed example of a DCN 200 designed to recognize visual features from an image 226 input from an image capturing device 230, such as a image capture and processing system 100 of FIG. 1. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. Adjusting the weights in such a manner may be referred to as "back propagation," as it involves a "backward pass" through the neural network.

In practice, the error gradient of weights may be calculated over a small number of examples, so that the calculated gradient approximates the true error gradient. The approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., feature maps 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 3:
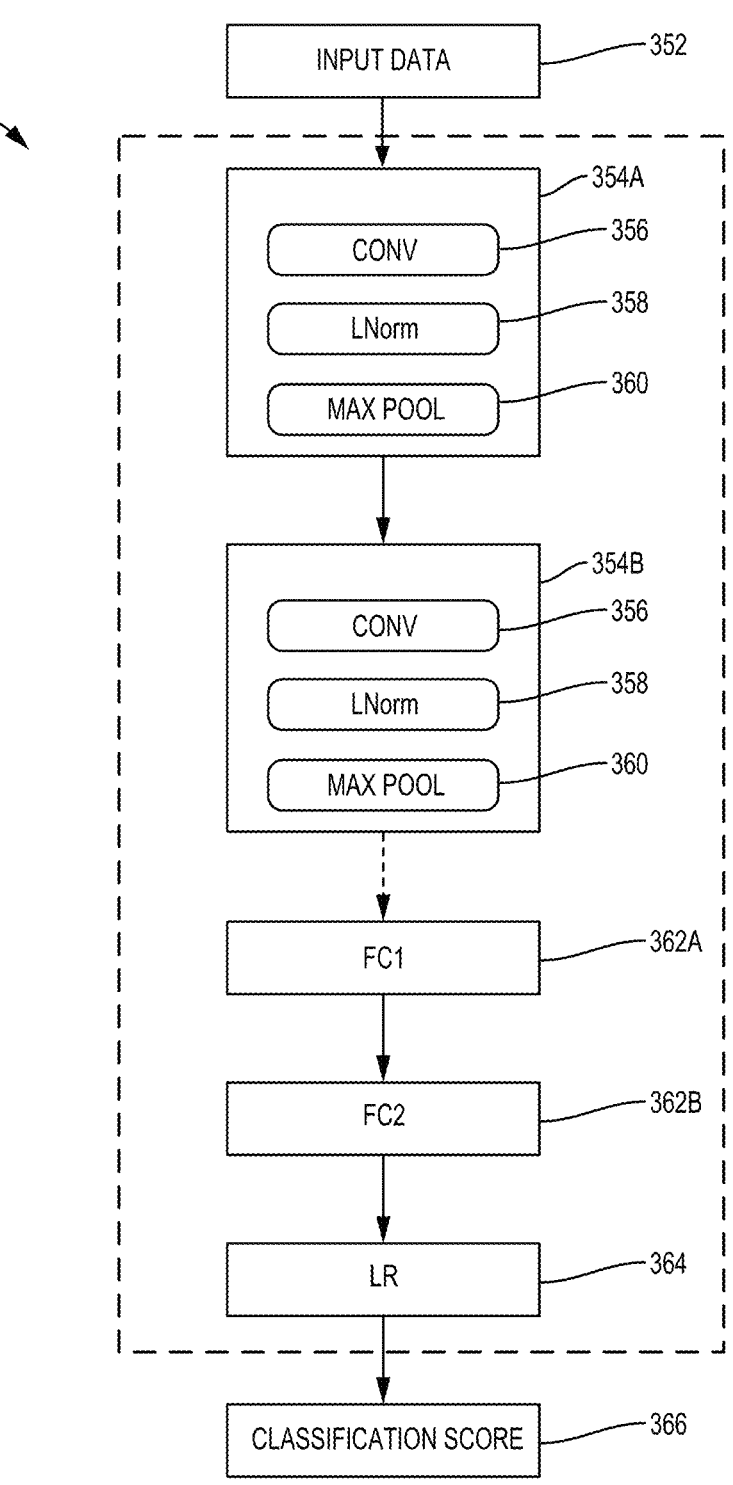
FIG. 3 is a block diagram illustrating an example deep convolutional network (DCN), in accordance with some examples of the present disclosure.

FIG. 3 is a block diagram illustrating an example of a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360. In some cases, the layers illustrated with respect to convolution blocks 354A and 354B are examples of layers that may be included in a convolution layer and are not intended to be limiting and other types of layers may be included in any order.

The convolution layers 356 may include one or more convolutional filters, which may be applied to the input data 352 to generate a feature map. Although only two convolution blocks 354A, 354B are shown, the present disclosure is not so limiting, and instead, any number of convolution blocks (e.g., convolution blocks 354A, 354B) may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a processor such as a CPU or GPU, or any other type of processor 1010 discussed with respect to the computing system 700 of FIG. 7 to achieve high performance and low power consumption. In alternative aspects, the parallel filter banks may be loaded on a DSP or an ISP of the computing system 700 of FIG. 7. In addition, the deep convolutional network 350 may access other processing blocks that may be present on the computing system 700 of FIG. 7, such as sensor processor and navigation module, dedicated, respectively, to sensors and navigation.

The deep convolutional network 350 may also include one or more fully connected layers, such as layer 362A (labeled "FC1") and layer 362B (labeled "FC2"). The deep convolutional network 350 may further include a logistic regression (LR) layer 364. Between each layer 356, 358, 360, 362A, 362B, 364 of the deep convolutional network 350 are weights (not shown) that are to be updated. The output of each of the layers (e.g., layers 356, 358, 360, 362A, 362B, 364) may serve as an input of a succeeding one of the layers (e.g., layers 356, 358, 360, 362A, 362B, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

In some cases, one or more convolutional networks, such as a DCN, may be incorporated into more complex ML networks. As an example, as indicated above, the deep convolutional network 350 may output probabilities that an input data, such as an image, includes certain features. The deep convolutional network 350 may then be modified to extract (e.g., output) certain features. Additionally, DCNs may be added to extract other features as well. The set of DCNs may function as feature extractors to identify features in an image. In some cases, feature extractors may be used as a backbone for additionally ML network components to perform further operations, such as image segmentation.

As indicated above, optical flow can be used by a device to help detect and/or track objects in an environment by detecting movement over time based on a difference between a position of an image feature at a first point in time and the position of the image feature at a second point in time. Disparity information may indicate positional changes for an object between two images of the object relative to the position of the cameras capturing the images and disparity information may be converted to depth information based on, for example, a baseline distance between the cameras, focal length of the cameras, etc. The depth information may be used by a device to determine how far away a particular object is. In some cases, optical flow information and depth information may be used by a device, for example, to 3D reconstruct an environment and/or detect, locate, and/or track objects in the environment. Reconstructing an environment and/or detecting, locating, and/or tracking objects in the environment around the device may be useful to help the device map, navigate, and/or maneuver around in the environment.

Machine learning models have been applied to predicting optical flow and disparity. Existing techniques for predicting optical flow and disparity may effectively utilize separate ML networks for optical flow and disparity. As used here a ML network may be a set of layers, units, pipeline, etc. dedicated for a specific task, such as predicting optical flow or disparity. A first ML network may be separate from a second ML network if the first ML network does not share output from intermediate layers (as opposed to an input layer or output layer) with another ML network. Often, these separate ML networks may share input and run independently in parallel. In some cases, the ML networks may run serially with output of one ML network, such as for one for predicting disparity, being input into another ML network, such as one for predicting optical flow. However, neither design unifies optical flow and depth estimation such that ML networks for optical flow and depth estimation may execute concurrently while sharing intermediate data. For example, a first ML network may predict the optical flow, in part, based on intermediate data from a second ML network for predicting disparity and the second ML network may predict the disparity, in part, based on intermediate data from the first ML network predicting the optical flow.

Figure 4:
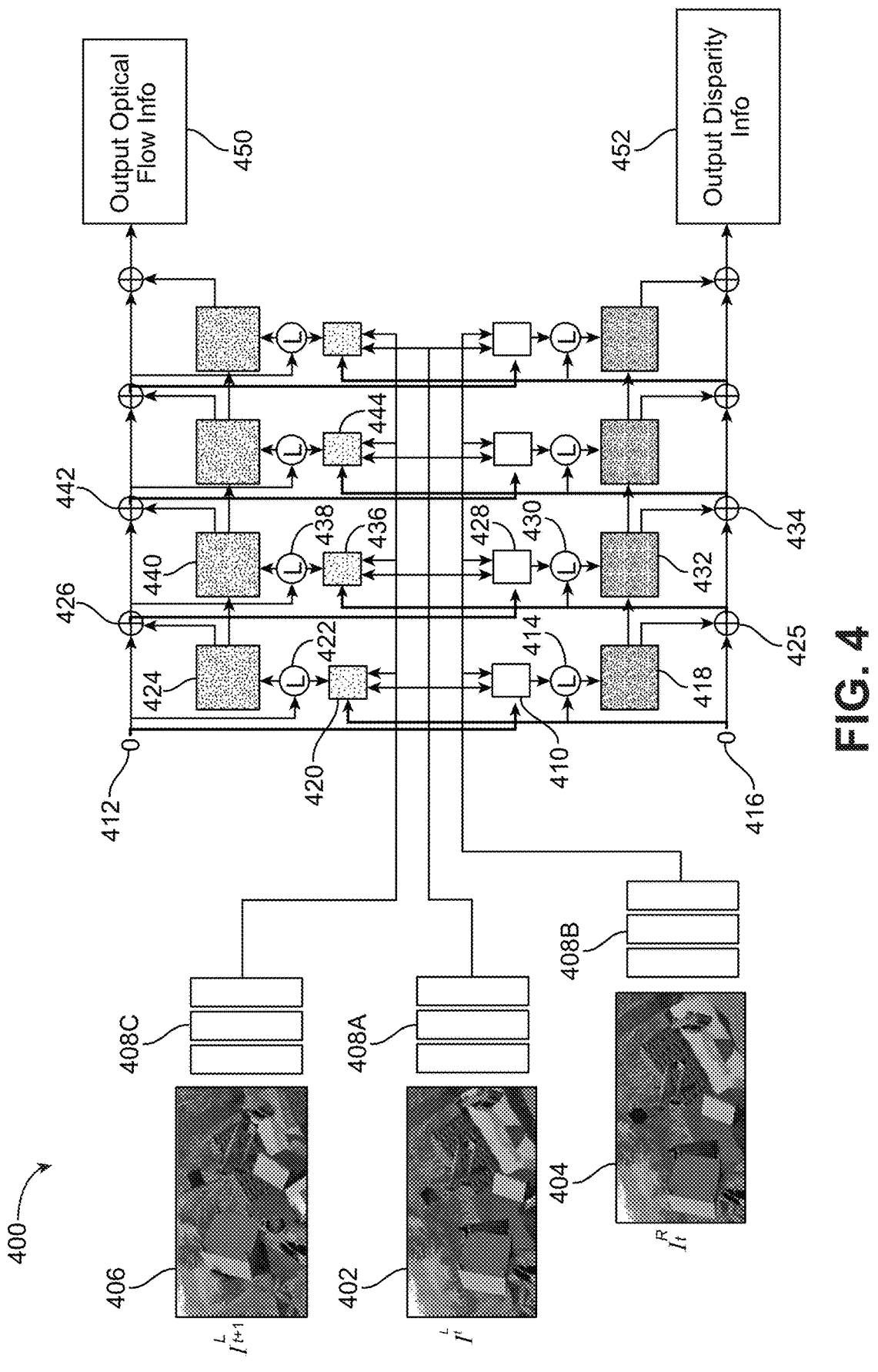
FIG. 4 is a block diagram illustrating a convolution and transformer-based machine learning (ML) model for performing image segmentation, in accordance with aspects of the present disclosure.

FIG. 4 is a block diagram illustrating a unified simultaneous optical flow and depth estimation ML model 400, in accordance with aspects of the present disclosure. As shown in FIG. 4, images obtained from multiple cameras and at multiple times may be input to ML model 400. Depth information may be obtained from images captured from at least two viewpoints. Optical flow information may be obtained from images from at least two time periods. In some cases, optical flow information may be extracted from a single viewpoint for the at least two time periods. Features may also be extracted from the images.

For example, as shown in FIG. 4, a first image 402 and a second image 404 may be obtained at a first time period t. The first image 402 may be obtained from one camera of a plurality of cameras configured for stereo imaging. For example, the cameras may be mounted at known distances from one another, where a first camera may be mounted to the left, relative to a second camera, and the second camera may be mounted on the right, relative to the first camera. The first camera and the second camera may have respective fields of view that are substantially overlapping. In such an example, the first image 402 may be obtained by the first camera (e.g., left camera) and the second image 404 may be obtained by the second camera (e.g., right camera) also at time t. A third image 406 may also be obtained at a second time period t+1 after the first time. In this example, the third image 406 is obtained from the first camera (e.g., left camera). In some cases, the third image 406 may be obtained from either camera. It may also be understood that, while FIG. 4 is described in the context of two cameras (e.g., with one camera on a left side and the other camera is on a right side), this is not intended to be limiting. For example, any number of cameras may be used and the cameras may be mounted in any position relative to each other, as long as a field of view of the cameras have some amount of overlap.

The obtained first image 402, second image 404, and third image 406 may be input into one or more feature detectors 408A-408C (collectively feature detectors 408). While three feature detectors 408 are shown in FIG. 4, it may be understood that any number of feature detectors 408 may be used. In some cases, the feature detectors 408 may include one or more ML networks configured to detect image features in input images. In some cases, the one or more ML networks of the feature detectors may be similar to deep convolutional network 350 of FIG. 3. In FIG. 4, a first feature detector 408A may extract a first set of features from the first image 402 and a second feature detector 408B may extract a second set of features from the second image 404. The features extracted by the feature detectors may be passed into processing blocks of the ML model 400. In such an example, a processing block of the ML model 400 may have multiple ML layers including one or more correlational layers (either disparity correlational layers or optical flow correlational layers) and one more gating layers to generate intermediate data (either disparity intermediate data or optical flow disparity data).

For example, for a first disparity processing block, the first set of features from the first feature detector 408A and the second set of features from the second feature detector 408B may be passed into one or more first disparity correlational layers 410. In some aspects, a null set of intermediate optical flow information 412 (e.g., zeroed out or including null values) may also be input to the one or more first disparity correlational layers 410. In some cases, the optical flow information may indicate a direction corresponding pixels/features have moved between the first image and second image over time (e.g., between time period t and time period t+1).

The one or more first disparity correlational layers 410 may refine (e.g., combine) features of the first set of features with the intermediate optical flow information (here the null set of intermediate optical flow information 412) and refine features of the second set of features with the intermediate optical flow information (again, the null set of intermediate optical flow information 412). For example, the one or more first disparity correlational layers 410 may concatenate the first set of features with the null set of intermediate optical flow information 412 to refine the first set of features. The one or more first disparity correlational layers 410 may also concatenate the second set of features and the null set of intermediate optical flow information 412 to refine the second set of features. The one or more first disparity correlational layers 410 may also generate disparity cost volume (e.g., correlation volume) information by correlating the refined features of the first set of features and refined features of the second set of features. While the image features are described as being concatenated with the intermediate optical flow information to generate refined features in such an example, it should be understood that other techniques for combining the intermediate optical flow information and image features may be used instead, such as convolution, cross-attention, fusion techniques, etc. to generate the refined features.

In some cases, the one or more first disparity correlational layers 410 may perform convolutional, cross-attention, and/or dot product operations on the refined first set of features and the refined second set of features to generate the disparity cost volume information. For example, the one or more first disparity correlational layers 410 may perform an all pairs correlation where a unit (e.g., pixel, feature, etc.) from the refined first set of features may be correlated against all other units (e.g., pixel, feature, etc.) of the refined second set of features to generate information for the disparity cost volume. The process may be repeated for each unit (e.g., pixel, feature, etc.). Thus, the disparity cost volume information may indicate how features of the first image 402, captured from a left viewpoint, correlate with features of the second image 404, captured from a right viewpoint and the correlation may be informed by the optical flow information in later iterations (e.g., where the optical flow information is not the null set of intermediate optical flow information 412). In some cases, the disparity cost volume information may be generated at multiple resolutions.

The disparity cost information may be passed into a first lookup gating layers 414. The first lookup gating layers 414 may perform lookup operations for a first one or more gating layers 418. In some cases, as the resolution of disparity cost volume may be large, gating may be performed on local information (in which case the disparity cost information is local cost information). The local cost information may be passed into one or more gating layers 418. The first one or more gating layers 418 iteratively generate first intermediate disparity information. For example, the first one or more gating layers 418 may be a convolutional gated recurrent unit (GRU) based update operator that uses convolution operations in place of fully connected layers in the GRU to retrieve values from the cost volume information for generating the first intermediate disparity information. In some cases, values from the cost volume information may be retrieved for generating the first intermediate disparity information as output of the first one or more gating layers 418 based on a difference between previous intermediate disparity information (here, a null set of intermediate disparity information 416) and output of the GRU operator. In some cases, the first intermediate disparity information output from the one or more disparity gating layers 418 may be combined with previous intermediate disparity information (here, the null set of intermediate disparity information 416). For example, the first intermediate disparity information may be summed with the null set of intermediate disparity information 416 at adder 425 to obtain second intermediate disparity information. While shown as a summing operation in FIG. 4, it should be understood that this is not intended to be limiting and any combining operation may be used, such as concatenate, fusion, etc.

Similarly, for a first optical flow processing block, the first set of features from the first feature detector 408A and the third set of features from the third feature detector 408C may be passed into one or more first optical flow correlational layers 420. In some aspects, the null set of intermediate disparity information 416 (e.g., zeroed out or including null values) may also be input to the one or more first optical flow correlational layers 420. In some cases, the disparity information (e.g., disparity map) may indicate an amount of disparity between corresponding pixels for the first image and the second image.

The one or more first optical flow correlational layers 420 may refine (e.g., combine) features of the first set of features with the intermediate disparity information (here the null set of intermediate disparity information 416) and refine features of the third set of features with the intermediate disparity information. For example, the one or more first optical flow correlational layers 420 may concatenate the first set of features with the null set of intermediate disparity information 416 to refine the first set of features. The one or more first optical flow correlational layers 420 may also concatenate the third set of features and the null set of intermediate disparity information 416 to refine the third set of features. The one or more first optical flow correlational layers 420 may also generate optical flow cost volume information by correlating the refined features of the first set of features and the refined features of the third set of features. While concatenation is described to generate refined features in this example, it should be understood that other techniques for combining the optical flow information and image features may be used instead, such as cross-attention, fusion techniques, etc. to generate the refined features.

In some cases, the one or more first optical flow correlational layers 420 may perform convolutional, cross-attention, and/or dot product operations on the refined first set of features and the refined second set of features to generate the disparity cost volume information. For example, the one or more first optical flow correlational layers 420 may perform an all pairs correlation where a unit (e.g., pixel, feature, etc.) from the refined first set of features may be correlated against all other units (e.g., pixel, feature, etc.) of the refined third set of features to generate information for the optical flow cost volume. The process may be repeated for each unit (e.g., pixel, feature, etc.). Thus, the optical flow cost volume information may indicate how features of the first image 402, captured during a first time period t, correlate with features of the third image 406, captured from a second, later time period t+1, and the correlation may be informed by the disparity information in later iterations (e.g., where the disparity information is not the null set of intermediate disparity information 416). In some cases, the optical flow cost volume information may be generated at multiple resolutions.

In a manner similar to that described above with respect to the disparity, the optical flow gating layers 422 may perform lookup operations to obtain local information. In a manner similar to that described above, the one or more optical flow gating layers 424 may iteratively generate and output first intermediate optical flow information in a manner similar to that described above for the one or more disparity gating layers 418 with respect to generating intermediate disparity information.

In some cases, the first intermediate optical flow information output by the one or more optical flow gating layers 424 may be combined with the previous intermediate optical flow information (here, the null set of intermediate optical flow information 412). For example, the first intermediate optical flow information may be summed with the null set of intermediate optical flow information 412 at adder 426 to obtain second intermediate optical flow information. While shown as a summing operation in FIG. 4, it should be understood that this is not intended to be limiting and any combining operation may be used, such as concatenate, fusion, etc.

For a second disparity processing block, the second intermediate optical flow information from adder 426 may be passed into one or more second disparity correlational layers 428 along with the first set of features from the first feature detector 408A and the second set of features from the second feature detector 408B. Like the one or more first disparity correlational layers 410, the one or more second disparity correlational layers 428 may refine the first set of features and the second set of features using the second intermediate optical flow information and generate disparity cost volume information based on the refined first set of features and the refined second set of features.

In some cases, a lookup operation may be performed by a second lookup gating layers 430 for the disparity cost volume information from the one or more second disparity correlational layers 428. In a manner similar to that described above with respect to the one or more disparity gating layers 418, the one or more disparity gating layers 432 may receive the disparity cost volume information along with the previous intermediate disparity information (here, the second intermediate disparity information from adder 425) and generate third intermediate disparity information for output by the one or more disparity gating layers 432. The third intermediate disparity information may be combined with the previous intermediate disparity information (here, the second intermediate disparity information from adder 425). For example, the third intermediate disparity information output by the one or more disparity gating layers 432 may be summed with the previous intermediate disparity information at adder 434 to obtain fourth intermediate disparity information. While shown as a summing operation in FIG. 4, it should be understood that this is not intended to be limiting and any combining operation may be used, such as concatenate, fusion, etc. As shown in FIG. 4, the fourth intermediate disparity information may be output to one or more third optical flow correlational layers 444 to generate additional intermediate optical flow information for a third optical flow processing block. In some cases, the fourth intermediate disparity information may be part of an output disparity information 452 that may be output by the unified simultaneous optical flow and depth estimation MIL model 400. For example, the fourth intermediate disparity information may be combined with additional disparity information from additional disparity processing blocks and then output as the output disparity information 452 after a last disparity processing block.

Similarly, for a second optical flow processing block, second intermediate disparity information from the adder 425 may be passed into one or more second optical flow correlational layers 436 along with the first set of features from the first feature detector 408A and the third set of features from the third feature detector 408C. Like the one or more first optical flow correlational layers 420, the one or more second optical flow correlational layers 436 may refine the first set of features and the third set of features using the second intermediate disparity information and generate optical flow cost volume information based on the refined first set of features and the refined third set of features.

In some cases, lookup operations may be performed by a second lookup gating layers 430 based on the optical flow cost volume information from the one or more second optical flow correlational layers 436. In a manner similar to that described above with respect to the one or more optical flow gating layers 424, the one or more optical flow gating layers 440 may receive the optical flow cost volume information along with the previous intermediate optical flow information (here, the second intermediate optical flow information from adder 426) and generate third intermediate disparity information. The third intermediate optical flow information output from the one or more optical flow gating layers 440 may be combined with the previous intermediate optical flow information (here, the second intermediate optical flow information from adder 426). For example, the third intermediate optical flow information output from the one or more optical flow gating layers 440 may be summed with the previous intermediate optical flow information from adder 442 to obtain fourth intermediate optical flow information. While shown as a summing operation in FIG. 4, it should be understood that this is not intended to be limiting and any combining operation may be used, such as concatenate, fusion, etc. In some cases, the fourth intermediate optical flow information may be part of an output optical flow information 450 that may be output by the unified simultaneous optical flow and depth estimation ML model 400. For example, the fourth intermediate optical flow information may be combined with additional optical flow information from additional optical flow processing blocks and then output as the output optical flow information 450 after a last optical flow processing block.

In some cases, additional optical flow processing blocks and disparity processing blocks may be coupled to the second optical flow processing block and second disparity processing block, respectively, in a manner substantially similar to that described above with respect to the second optical flow processing block and second disparity processing block. The exact number of optical flow processing blocks and disparity processing blocks that may be included in the unified simultaneous optical flow and depth estimation ML model 400 is a design choice.

Figure 5:
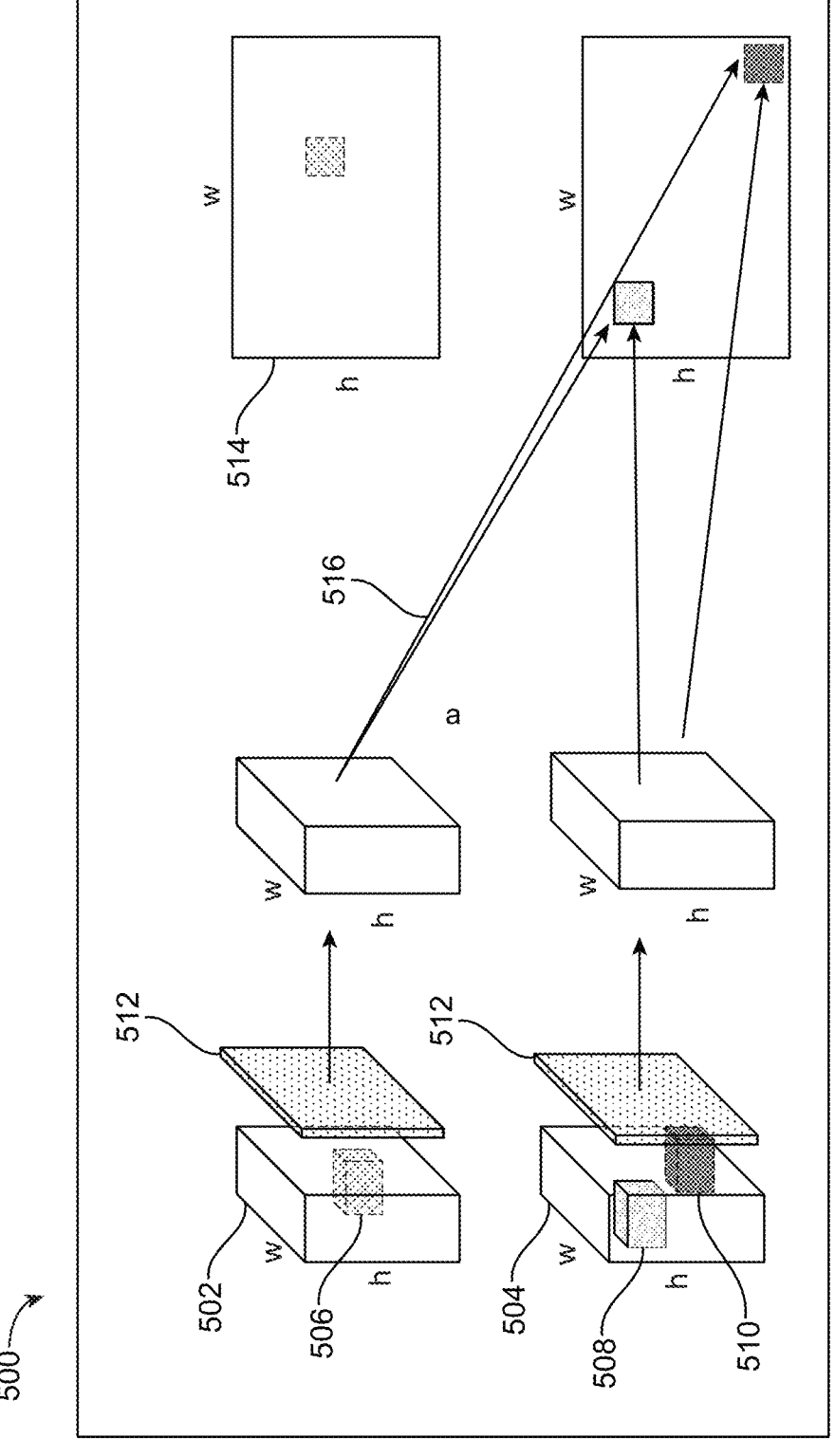
FIG. 5 is block diagram illustrating operations performed by the correlational layers of the unified simultaneous optical flow and depth estimation ML model, in accordance with aspects of the present disclosure

FIG. 5 is block diagram illustrating operations performed by the correlational layers 500 of the unified simultaneous optical flow and depth estimation ML model, in accordance with aspects of the present disclosure. As discussed above, the unified simultaneous optical flow and depth estimation ML model 400 may include disparity correlational layers and optical flow correlational layers, which may both operate in a similar manner.

In FIG. 5, the correlational layers 500 may obtain two set of features, feature set A 502 and feature set B 504. In some cases, the correlational layers 500 may refine the feature set using refinement information 512, such as intermediate depth information or intermediate optical flow information. For example, as discussed above, the optical flow correlational layers may use intermediate depth information to refine features for determining the optical flow information. Similarly, the depth correlational layers may use intermediate optical flow information to refine features for determining the depth information. In FIG. 5, the feature set A 502 may be refined by combining feature set A 502 with the refinement information. Similarly, feature set B 504 may also be refined by combining feature set B 504 with the refinement information. The combining may be performed by any combining technique such as concatenation, convolution, cross attention, fusion techniques, etc. Refining the feature information with intermediate depth information or intermediate optical flow information may provide greater accuracy and speed by allowing the depth prediction to take advantage of the optical flow information being concurrently determined, and vice versa.

Once refined, features of feature set may be correlated. For example, a feature in feature set A 502 may be correlated against to all the features in feature set B 504. As a more simplified example, a first feature 506 from feature set A 502 may be compared to a second feature 508 and compared to a third feature 510 of feature set B 504. For example, each feature may be associated with a location that can be described on a height axis H and a width axis W with respect to an image the feature is associated with. Thus, the first feature 506 may be associated with a location H×W. The first feature 506 may also be located in a cost volume 514 based on the location H×W. The first feature 506 may be compared 516 to the second feature 508 and the third feature 510 to determine how different the first feature 506 is from the second feature 508 and how different the first feature 506 is from the third feature 510. For example, dot products may be determined between the first feature 506 and the second feature 508 and between the first feature 506 and the third feature 510. The difference between the first feature 506 from the second feature 508 and the third feature 510 may then be stored in the cost volume 514 associated with the first feature 506 based on the location H×W.

FIG. 6 is a flow diagrams illustrating a process 600 for processing image data, in accordance with aspects of the present disclosure. The process 600 may be performed by a computing device (or apparatus) or a component (e.g., a chipset, codec, one or more processors such as a CPU, a GPU, an NPU, a DSP, etc.) of the computing device, such as image capturing and processing system 100 of FIG. 1 and/or computing system 700 of FIG. 7. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 600 may be implemented as software components that are executed and run on one or more processors (e.g., the image processor 150 of FIG. 1, the host processor 152 of FIG. 1, processor 710 of FIG. 7, and/or other processor(s)). In some cases, the operations of the process 600 can be implemented by a system having the architecture of computing system 700 of FIG. 7.

At block 602, the computing device (or component thereof) may correlate a first set of features obtained from a first viewpoint at a first time period (e.g., first image 402 of FIG. 4) with a second set of features obtained from a second viewpoint (e.g., second image 404 of FIG. 4) at the first time period to generate a first disparity cost volume (e.g., output from the one or more first disparity correlational layers 410 of FIG. 4).

At block 604, the computing device (or component thereof) may correlate a third set of features obtained from the first viewpoint at a second time period with the first set of features to generate a first optical flow cost volume (e.g., output from the one or more first optical flow correlational layers 420 of FIG. 4).

At block 606, the computing device (or component thereof) may gate the first disparity cost volume to generate first intermediate disparity information (e.g., by the one or more disparity gating layers 418 of FIG. 4).

At block 608, the computing device (or component thereof) may gate the first optical flow cost volume to generate first intermediate optical flow information (e.g., by the one or more optical flow gating layers 424 of FIG. 4). In some cases, the computing device (or component thereof) may concatenate the first intermediate optical flow information and the second intermediate optical flow information (e.g., by the one or more second optical flow correlational layers 436) to generate concatenated optical flow information; and concatenate the first intermediate disparity information and the second intermediate disparity information (e.g., by the the one or more second disparity correlational layers 428 of FIG. 4) to generate concatenated disparity information.

At block 610, the computing device (or component thereof) may correlate the first set of features, the second set of features, and the first intermediate optical flow information to generate disparity information for output (e.g., by the one or more second disparity correlational layers 428 of FIG. 4). In some examples, the computing device (or component thereof) may correlate the first set of features, second set of features, and the first intermediate optical flow information to generate a second disparity cost volume (e.g., output from the one or more second disparity correlational layers 428 of FIG. 4), and correlate the third set of features, the first set of features, and the first intermediate disparity information to generate a second optical flow cost volume (e.g., output from the one or more second optical flow correlational layers 436 of FIG. 4). In some cases, the computing device (or component thereof) may gate the second disparity cost volume to generate second intermediate disparity information (e.g., by the one or more disparity gating layers 432 of FIG. 4); gate the second optical flow cost volume to generate second intermediate optical flow information (e.g., by the one or more optical flow gating layers 440 of FIG. 4); output disparity information based on the second intermediate disparity information; and output optical flow information based on the second intermediate optical flow information. In some examples, the computing device (or component thereof) may output disparity information and optical flow information by outputting the concatenated disparity information and the concatenated optical flow information. In some cases, the computing device (or component thereof) may correlate the first set of features, the second set of features, and the first intermediate optical flow information by combining the first set of features with the first intermediate optical flow information to refine the first set of features; combining the second set of features with the first intermediate optical flow information (e.g., by the one or more second disparity correlational layers 428 of FIG. 4) to refine the second set of features; and comparing the refined first set of features and the refined second set of features to generate the second disparity cost volume. In some examples, the computing device (or component thereof) may combine the first set of features with the first intermediate optical flow information by concatenating the first set of features with the first intermediate optical flow information; and combine the second set of features with the first intermediate optical flow information by concatenating the second set of features with the first intermediate optical flow information. In some cases, the computing device (or components hereof) may compare the refined first set of features and the refined second set of features by determining a dot product between a feature of the refined first set of features and a feature of the refined second set of features.

At block 612, the computing device (or component thereof) may correlate the third set of features, the first set of features, and the first intermediate disparity information to generate optical flow information for output (e.g., by the one or more second optical flow correlational layers 436 of FIG. 4). In some examples, the computing device (or component thereof) may correlate the third set of features, the first set of features, and the first intermediate disparity information by combining the first set of features with the first intermediate disparity information to refine the first set of features; combining the third set of features with the first intermediate disparity information to refine the second set of features; and comparing the refined first set of features and the refined third set of features to generate the second optical flow cost volume. In some cases, the computing device (or component thereof) may combine the first set of features with the first intermediate disparity information by concatenating the first set of features with the first intermediate disparity information; and the computing device (or component thereof) may combine the third set of features with the first intermediate disparity information by concatenating the third set of features with the first intermediate disparity information. In some examples, the computing device (or component thereof) may compare the refined first set of features and the refined third set of features by determining a dot product between a feature of the refined first set of features and a feature of the refined third set of features.

FIG. 7 is a diagram illustrating an example of a system for implementing certain aspects of the present technology. In particular, FIG. 7 illustrates an example of computing system 700, which can be for example any computing device making up internal computing system, a remote computing system, a camera, or any component thereof in which the components of the system are in communication with each other using connection 705. Connection 705 can be a physical connection using a bus, or a direct connection into processor 710, such as in a chipset architecture. Connection 705 can also be a virtual connection, networked connection, or logical connection.

In some examples, computing system 700 is a distributed system in which the functions described in this disclosure can be distributed within a datacenter, multiple data centers, a peer network, etc. In some examples, one or more of the described system components represents many such components each performing some or all of the functions for which the component is described. In some cases, the components can be physical or virtual devices.

Example computing system 700 includes at least one processing unit (CPU or processor) 710 and connection 705 that couples various system components including system memory 715, such as read-only memory (ROM) 720 and random access memory (RAM) 725 to processor 710. Computing system 700 can include a cache 712 of high-speed memory connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, camera, accelerometers, gyroscopes, etc. Computing system 700 can also include output device 735, which can be one or more of a number of output mechanisms. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.10 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/Re-RAM), phase change memory (PCM), spin transfer torque RAM (STT-RAM), another memory chip or cartridge, and/or a combination thereof.

The storage device 730 can include software services, servers, services, etc., that when the code that defines such software is executed by the processor 710, it causes the system to perform a function. In some examples, a hardware service that performs a particular function can include the software component stored in a computer-readable medium in connection with the necessary hardware components, such as processor 710, connection 705, output device 735, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative Aspects of the Present Disclosure Include:

Aspect 1. A method for image processing, comprising: correlating a first set of features obtained from a first viewpoint at a first time period with a second set of features obtained from a second viewpoint at the first time period to generate a first disparity cost volume; correlating a third set of features obtained from the first viewpoint at a second time period with the first set of features to generate a first optical flow cost volume; gating the first disparity cost volume to generate first intermediate disparity information; gating the first optical flow cost volume to generate first intermediate optical flow information; correlating the first set of features, the second set of features, and the first intermediate optical flow information to generate disparity information for output; and correlating the third set of features, the first set of features, and the first intermediate disparity information to generate optical flow information for output.

Aspect 2. The method of Aspect 1, wherein: correlating the first set of features, second set of features, and the first intermediate optical flow information generates a second disparity cost volume; and correlating the third set of features, the first set of features, and the first intermediate disparity information generates a second optical flow cost volume.

Aspect 3. The method of Aspect 2, further comprising: gating the second disparity cost volume to generate second intermediate disparity information; gating the second optical flow cost volume to generate second intermediate optical flow information; outputting disparity information based on the second intermediate disparity information; and outputting optical flow information based on the second intermediate optical flow information.

Aspect 4. The method of Aspect 3, further comprising: concatenating the first intermediate optical flow information and the second intermediate optical flow information to generate concatenated optical flow information; and concatenating the first intermediate disparity information and the second intermediate disparity information to generate concatenated disparity information.

Aspect 5. The method of Aspect 4, wherein outputting disparity information and optical flow information comprising outputting the concatenated disparity information and the concatenated optical flow information.

Aspect 6. The method of any one of Aspects 2 to 5, wherein correlating the first set of features, the second set of features, and the first intermediate optical flow information comprises: combining the first set of features with the first intermediate optical flow information to refine the first set of features; combining the second set of features with the first intermediate optical flow information to refine the second set of features; and comparing the refined first set of features and the refined second set of features to generate the second disparity cost volume.

Aspect 7. The method of Aspect 6, wherein: combining the first set of features with the first intermediate optical flow information comprises concatenating the first set of features with the first intermediate optical flow information; and combining the second set of features with the first intermediate optical flow information comprises concatenating the second set of features with the first intermediate optical flow information.

Aspect 8. The method of any one of Aspects 6 or 7, wherein comparing the refined first set of features and the refined second set of features comprises determining a dot product between a feature of the refined first set of features and a feature of the refined second set of features.

Aspect 9. The method of any one of Aspects 2 to 5, wherein correlating the third set of features, the first set of features, and the first intermediate disparity information comprises: combining the first set of features with the first intermediate disparity information to refine the first set of features; combining the third set of features with the first intermediate disparity information to refine the second set of features; and comparing the refined first set of features and the refined third set of features to generate the second optical flow cost volume.

Aspect 10. The method of Aspect 9, wherein: combining the first set of features with the first intermediate disparity information comprises concatenating the first set of features with the first intermediate disparity information; and combining the third set of features with the first intermediate disparity information comprises concatenating the third set of features with the first intermediate disparity information.

Aspect 11. The method of any one of Aspects 9 or 10, wherein comparing the refined first set of features and the refined third set of features comprises determining a dot product between a feature of the refined first set of features and a feature of the refined third set of features.

Aspect 12. An apparatus for image processing, comprising: at least one memory; and at least one processor coupled to the at least one memory, the at least one processor being configured to: correlate a first set of features obtained from a first viewpoint at a first time period with a second set of features obtained from a second viewpoint at the first time period to generate a first disparity cost volume; correlate a third set of features obtained from the first viewpoint at a second time period with the first set of features to generate a first optical flow cost volume; gate the first disparity cost volume to generate first intermediate disparity information; gate the first optical flow cost volume to generate first intermediate optical flow information; correlate the first set of features, the second set of features, and the first intermediate optical flow information to generate disparity information for output; and correlate the third set of features, the first set of features, and the first intermediate disparity information to generate optical flow information for output.

Aspect 13. The apparatus of Aspect 12, wherein the at least one processor is further configured to: correlate the first set of features, second set of features, and the first intermediate optical flow information generates a second disparity cost volume; and correlate the third set of features, the first set of features, and the first intermediate disparity information generates a second optical flow cost volume.

Aspect 14. The apparatus of Aspect 13 wherein the at least one processor is further configured to: gate the second disparity cost volume to generate second intermediate disparity information; gate the second optical flow cost volume to generate second intermediate optical flow information; output disparity information based on the second intermediate disparity information; and output optical flow information based on the second intermediate optical flow information.

Aspect 15. The apparatus of Aspect 14, wherein the at least one processor is further configured to: concatenate the first intermediate optical flow information and the second intermediate optical flow information to generate concatenated optical flow information; and concatenate the first intermediate disparity information and the second intermediate disparity information to generate concatenated disparity information.

Aspect 16. The apparatus of Aspect 15, wherein, to output disparity information and optical flow information, the at least one processor is configured to output the concatenated disparity information and the concatenated optical flow information.

Aspect 17. The apparatus of any one of Aspects 13 to 15, wherein, to correlate the first set of features, the second set of features, and the first intermediate optical flow information, the at least one processor is configured to: combine the first set of features with the first intermediate optical flow information to refine the first set of features; combine the second set of features with the first intermediate optical flow information to refine the second set of features; and compare the refined first set of features and the refined second set of features to generate the second disparity cost volume.

Aspect 18. The apparatus of Aspect 17, wherein the at least one processor is further configured to: combine the first set of features with the first intermediate optical flow information comprises concatenating the first set of features with the first intermediate optical flow information; and combine the second set of features with the first intermediate optical flow information comprises concatenating the second set of features with the first intermediate optical flow information.

Aspect 19. The apparatus of any one of Aspects 17 or 18, wherein, to compare the refined first set of features and the refined second set of features, the at least one processor is configured to determine a dot product between a feature of the refined first set of features and a feature of the refined second set of features.

Aspect 20. The apparatus of any one of Aspects 13 to 15, wherein, to correlate the third set of features, the first set of features, and the first intermediate disparity information, the at least one processor is configured to: combine the first set of features with the first intermediate disparity information to refine the first set of features; combine the third set of features with the first intermediate disparity information to refine the second set of features; and compare the refined first set of features and the refined third set of features to generate the second optical flow cost volume.

Aspect 21. The apparatus of Aspect 20, wherein: to combine the first set of features with the first intermediate disparity information, the at least one processor is configured to concatenate the first set of features with the first intermediate disparity information; and to combine the third set of features with the first intermediate disparity information, the at least one processor is configured to concatenate the third set of features with the first intermediate disparity information.

Aspect 22. The apparatus of any one of Aspects 20 or 21, wherein, to compare the refined first set of features and the refined third set of features, the at least one processor is further configured to determine a dot product between a feature of the refined first set of features and a feature of the refined third set of features.

Aspect 23. A non-transitory computer-readable medium having stored thereon instructions that, when executed by at least one processor, cause the at least one processor to: correlate a first set of features obtained from a first viewpoint at a first time period with a second set of features obtained from a second viewpoint at the first time period to generate a first disparity cost volume; correlate a third set of features obtained from the first viewpoint at a second time period with the first set of features to generate a first optical flow cost volume; gate the first disparity cost volume to generate first intermediate disparity information; gate the first optical flow cost volume to generate first intermediate optical flow information; correlate the first set of features, the second set of features, and the first intermediate optical flow information to generate disparity information for output; and correlate the third set of features, the first set of features, and the first intermediate disparity information to generate optical flow information for output.

Aspect 24. The non-transitory computer-readable medium of Aspect 23, wherein the instructions cause the at least one processor to: correlate the first set of features, second set of features, and the first intermediate optical flow information generates a second disparity cost volume; and correlate the third set of features, the first set of features, and the first intermediate disparity information generates a second optical flow cost volume.

Aspect 25. The non-transitory computer-readable medium of Aspect 24 wherein the instructions cause the at least one processor to: gate the second disparity cost volume to generate second intermediate disparity information; gate the second optical flow cost volume to generate second intermediate optical flow information; output disparity information based on the second intermediate disparity information; and output optical flow information based on the second intermediate optical flow information.

Aspect 26. The non-transitory computer-readable medium of Aspect 25, wherein the instructions cause the at least one processor to: concatenate the first intermediate optical flow information and the second intermediate optical flow information to generate concatenated optical flow information; and concatenate the first intermediate disparity information and the second intermediate disparity information to generate concatenated disparity information.

Aspect 27. The non-transitory computer-readable medium of Aspect 26, wherein, to output disparity information and optical flow information, the instructions cause the at least one processor to output the concatenated disparity information and the concatenated optical flow information.

Aspect 28. The non-transitory computer-readable medium of any one of Aspects 24 to 27, wherein, to correlate the first set of features, the second set of features, and the first intermediate optical flow information, the instructions cause the at least one processor to: combine the first set of features with the first intermediate optical flow information to refine the first set of features; combine the second set of features with the first intermediate optical flow information to refine the second set of features; and compare the refined first set of features and the refined second set of features to generate the second disparity cost volume.

Aspect 29. The non-transitory computer-readable medium of Aspect 28, wherein instructions cause the at least one processor to: combine the first set of features with the first intermediate optical flow information comprises concatenating the first set of features with the first intermediate optical flow information; and combine the second set of features with the first intermediate optical flow information comprises concatenating the second set of features with the first intermediate optical flow information.

Aspect 30. The non-transitory computer-readable medium of any one of Aspects 28 or 29, wherein, to compare the refined first set of features and the refined second set of features, the instructions cause the at least one processor to determine a dot product between a feature of the refined first set of features and a feature of the refined second set of features.

Aspect 34: An apparatus for image processing, comprising means for performing one or more of operations according to any of Aspects 1 to 11.

What is claimed is:

1. A method for image processing, comprising:
correlating a first set of features obtained from a first viewpoint at a first time period with a second set of features obtained from a second viewpoint at the first time period to generate a first disparity cost volume;
correlating a third set of features obtained from the first viewpoint at a second time period with the first set of features to generate a first optical flow cost volume;
gating the first disparity cost volume to generate first intermediate disparity information;
gating the first optical flow cost volume to generate first intermediate optical flow information;
correlating the first set of features, the second set of features, and the first intermediate optical flow information to generate disparity information for output and a second disparity cost volume; and
correlating the third set of features, the first set of features, and the first intermediate disparity information to generate optical flow information for output and a second optical flow cost volume;
wherein correlating the first set of features, the second set of features, and the first intermediate optical flow information comprises:
combining the first set of features with the first intermediate optical flow information to refine the first set of features;
combining the second set of features with the first intermediate optical flow information to refine the second set of features; and
comparing the refined first set of features and the refined second set of features to generate the second disparity cost volume;
wherein:
combining the first set of features with the first intermediate optical flow information comprises concatenating the first set of features with the first intermediate optical flow information; and
combining the second set of features with the first intermediate optical flow information comprises concatenating the second set of features with the first intermediate optical flow information.

2. The method of claim 1, further comprising:
gating the second disparity cost volume to generate second intermediate disparity information;
gating the second optical flow cost volume to generate second intermediate optical flow information;
outputting disparity information based on the second intermediate disparity information; and
outputting optical flow information based on the second intermediate optical flow information.

3. The method of claim 2, further comprising:
concatenating the first intermediate optical flow information and the second intermediate optical flow information to generate concatenated optical flow information; and
concatenating the first intermediate disparity information and the second intermediate disparity information to generate concatenated disparity information.

4. The method of claim 3, wherein outputting disparity information and optical flow information comprising outputting the concatenated disparity information and the concatenated optical flow information.

5. The method of claim 1, wherein comparing the refined first set of features and the refined second set of features comprises determining a dot product between a feature of the refined first set of features and a feature of the refined second set of features.

6. The method of claim 1, wherein correlating the third set of features, the first set of features, and the first intermediate disparity information comprises:
combining the first set of features with the first intermediate disparity information to refine the first set of features;
combining the third set of features with the first intermediate disparity information to refine the second set of features; and
comparing the refined first set of features and the refined third set of features to generate the second optical flow cost volume.

7. The method of claim 6, wherein comparing the refined first set of features and the refined third set of features comprises determining a dot product between a feature of the refined first set of features and a feature of the refined third set of features.

8. The method of claim 1, wherein:
combining the first set of features with the first intermediate disparity information comprises concatenating the first set of features with the first intermediate disparity information; and
combining the third set of features with the first intermediate disparity information comprises concatenating the third set of features with the first intermediate disparity information.

9. An apparatus for image processing, comprising:
at least one memory; and
at least one processor coupled to the at least one memory, the at least one processor being configured to:
correlate a first set of features obtained from a first viewpoint at a first time period with a second set of features obtained from a second viewpoint at the first time period to generate a first disparity cost volume;
correlate a third set of features obtained from the first viewpoint at a second time period with the first set of features to generate a first optical flow cost volume;
gate the first disparity cost volume to generate first intermediate disparity information;
gate the first optical flow cost volume to generate first intermediate optical flow information;
correlate the first set of features, the second set of features, and the first intermediate optical flow information to generate disparity information for output and a second disparity cost volume; and
correlate the third set of features, the first set of features, and the first intermediate disparity information to generate optical flow information for output and a second optical flow cost volume;
wherein, to correlate the first set of features, the second set of features, and the first intermediate optical flow information, the at least one processor is configured to:
combine the first set of features with the first intermediate optical flow information to refine the first set of features;
combine the second set of features with the first intermediate optical flow information to refine the second set of features; and
compare the refined first set of features and the refined second set of features to generate the second disparity cost volume;

35 wherein:
to combine the first set of features with the first intermediate optical flow information, the at least one processor is further configured to concatenate the first set of features with the first intermediate optical flow information; and
to combine the second set of features with the first intermediate optical flow information, the at least one processor is further configured to concatenate the second set of features with the first intermediate optical flow information.

10. The apparatus of claim 9, wherein the at least one processor is further configured to:
gate the second disparity cost volume to generate second intermediate disparity information;
gate the second optical flow cost volume to generate second intermediate optical flow information;
output disparity information based on the second intermediate disparity information; and
output optical flow information based on the second intermediate optical flow information.

11. The apparatus of claim 10, wherein the at least one processor is further configured to:
concatenate the first intermediate optical flow information and the second intermediate optical flow information to generate concatenated optical flow information; and
concatenate the first intermediate disparity information and the second intermediate disparity information to generate concatenated disparity information.

12. The apparatus of claim 11, wherein, to output disparity information and optical flow information, the at least one processor is configured to output the concatenated disparity information and the concatenated optical flow information.

13. The apparatus of claim 9, wherein, to compare the refined first set of features and the refined second set of features, the at least one processor is configured to determine a dot product between a feature of the refined first set of features and a feature of the refined second set of features.

14. The apparatus of claim 9, wherein, to correlate the third set of features, the first set of features, and the first intermediate disparity information, the at least one processor is configured to:
combine the first set of features with the first intermediate disparity information to refine the first set of features;
combine the third set of features with the first intermediate disparity information to refine the second set of features; and
compare the refined first set of features and the refined third set of features to generate the second optical flow cost volume.

15. The apparatus of claim 14, wherein:
to combine the first set of features with the first intermediate disparity information, the at least one processor is configured to concatenate the first set of features with the first intermediate disparity information; and
to combine the third set of features with the first intermediate disparity information, the at least one processor is configured to concatenate the third set of features with the first intermediate disparity information.

16. The apparatus of claim 14, wherein, to compare the refined first set of features and the refined third set of features, the at least one processor is further configured to determine a dot product between a feature of the refined first set of features and a feature of the refined third set of features.

17. A non-transitory computer-readable medium having stored thereon instructions that, when executed by at least one processor, cause the at least one processor to:
correlate a first set of features obtained from a first viewpoint at a first time period with a second set of features obtained from a second viewpoint at the first time period to generate a first disparity cost volume;
correlate a third set of features obtained from the first viewpoint at a second time period with the first set of features to generate a first optical flow cost volume;
gate the first disparity cost volume to generate first intermediate disparity information;
gate the first optical flow cost volume to generate first intermediate optical flow information;
correlate the first set of features, the second set of features, and the first intermediate optical flow information to generate disparity information for output and a second disparity cost volume; and
correlate the third set of features, the first set of features, and the first intermediate disparity information to generate optical flow information for output and a second optical flow cost volume;
wherein, to correlate the first set of features, the second set of features, and the first intermediate optical flow information, the at least one processor is configured to:
combine the first set of features with the first intermediate optical flow information to refine the first set of features;
combine the second set of features with the first intermediate optical flow information to refine the second set of features; and
compare the refined first set of features and the refined second set of features to generate the second disparity cost volume;
wherein:
to combine the first set of features with the first intermediate optical flow information, the at least one processor is further configured to concatenate the first set of features with the first intermediate optical flow information; and
to combine the second set of features with the first intermediate optical flow information, the at least one processor is further configured to concatenate the second set of features with the first intermediate optical flow information.

18. The non-transitory computer-readable medium of claim 17 wherein the instructions cause the at least one processor to:
gate the second disparity cost volume to generate second intermediate disparity information;
gate the second optical flow cost volume to generate second intermediate optical flow information;
output disparity information based on the second intermediate disparity information; and
output optical flow information based on the second intermediate optical flow information.

19. The non-transitory computer-readable medium of claim 18, wherein the instructions cause the at least one processor to:
concatenate the first intermediate optical flow information and the second intermediate optical flow information to generate concatenated optical flow information; and
concatenate the first intermediate disparity information and the second intermediate disparity information to generate concatenated disparity information.

20. The non-transitory computer-readable medium of claim 19, wherein, to output disparity information and optical flow information, the instructions cause the at least one processor to output the concatenated disparity information and the concatenated optical flow information.

21. The non-transitory computer-readable medium of claim 17, wherein, to compare the refined first set of features and the refined second set of features, the instructions cause the at least one processor to determine a dot product between a feature of the refined first set of features and a feature of the refined second set of features.

* * * * *